(12) United States Patent
Chang

(10) Patent No.: US 6,805,092 B2

(45) Date of Patent: Oct. 19, 2004

(54) ADJUSTABLE INTAKE DEVICE FOR AN INTERNAL COMBUSTION ENGINE

(76) Inventor: Yung-Yu Chang, No. 75, Lane 223, Chung-Cheng Rd., Shan-Hua Chen, Tainan Hsien (TW)

( * ) Notice: Subject to any disclaimer, the term of this patent is extended or adjusted under 35 U.S.C. 154(b) by 0 days.

(21) Appl. No.: 10/392,853

(22) Filed: Mar. 21, 2003

(65) Prior Publication Data

US 2004/0182361 A1 Sep. 23, 2004

(51) Int. Cl.[7] ............................. F02B 31/06; F15D 1/02
(52) U.S. Cl. ......................................... 123/306; 138/39
(58) Field of Search ............................ 123/306, 590; 138/37, 39, 43, 46; 48/189.4

(56) References Cited

U.S. PATENT DOCUMENTS 4,424,777 A * 1/1984 Klomp .................. 123/188.7
4,539,954 A * 9/1985 Klomp .................. 123/306
4,962,642 A * 10/1990 Kim .................... 123/590

* cited by examiner

Primary Examiner—Andrew M. Dolinar
(74) Attorney, Agent, or Firm—Bacon & Thomas

(57) ABSTRACT

An intake device for an intake manifold of a internal combustion engine includes a seat, multiple ribs extending out from the seat and adapted to connect to an inner periphery of the intake manifold. Multiple blades each are arranged between two adjacent ribs. Each blade has a first side securely connected to the adjacent rib and a second side opposite to the first side and is movable relative to the first side. When the internal combustion engine operates, suction force generated inside the intake manifold is able to draw downward the second sides of the blades such that air drawn into the intake manifold flows helically and a gap defined between the second side and the adjacent second side of the blade is adjustable.

2 Claims, 5 Drawing Sheets

ADJUSTABLE INTAKE DEVICE FOR AN INTERNAL COMBUSTION ENGINE

BACKGROUND OF THE INVENTION

1. Field of the Invention

The present invention relates to an adjustable intake device, and more particularly to an intake device having multiple blades selectively movable based on a magnitude of the suction force, such that quantity of intake air is variable to cope with the rotation speed of an internal combustion engine.

2. Description of Related Art

A car requires a large propulsion force to overcome the static friction with the ground and the weight of the car itself to move forward from stationary. However, a conventional engine even equipped with an air directing device is not able to provide such function to provide a boost to the car, which results in that the fuel consumption is high and the acceleration is slow.

To overcome the shortcomings, the present invention tends to provide an improved intake device to mitigate and obviate the aforementioned problems.

SUMMARY OF THE INVENTION

The primary objective of the present invention is to provide an improved intake device for a internal combustion engine. The intake device has multiple blades each with a first side and a second side opposite to the first side. The first side is stationary and the second side is movable so that when the suction force is generated as a result of the operation of the internal combustion engine, the first sides of the blades are drawn downward to the intake manifold. Meanwhile, air is also drawn into the intake manifold. When the air is drawn into the intake manifold, the air path in the intake manifold is helical.

Another objective of the present invention is to provide an improved

Other objects, advantages and novel features of the invention will become more apparent from the following detailed description when taken in conjunction with the accompanying drawings.

DETAILED DESCRIPTION OF THE PREFERRED EMBODIMENT

Figure 1:
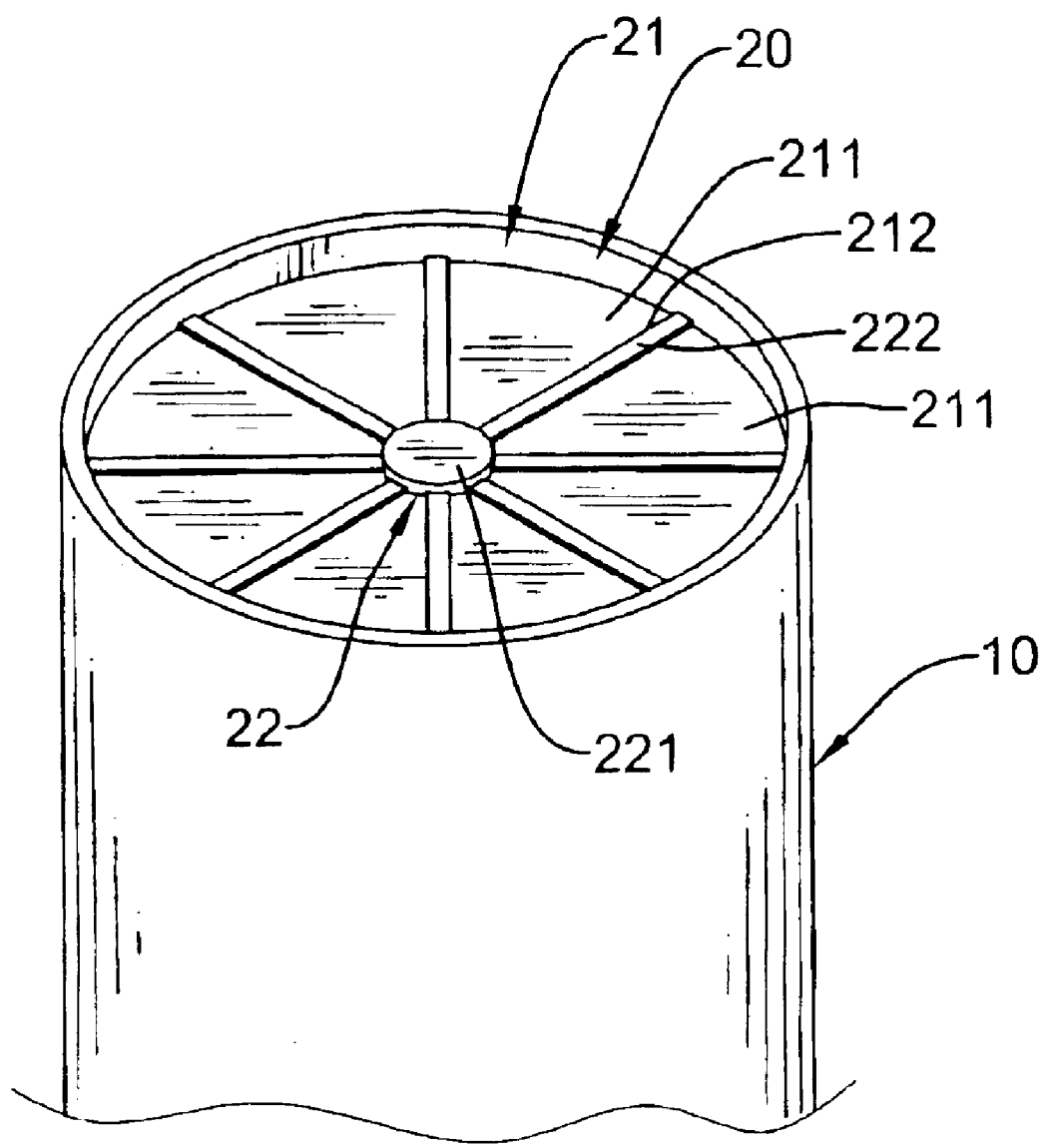
FIG. 1 is a perspective view of the intake device of the present invention installed in an intake manifold of a internal combustion engine.
Figure 2:
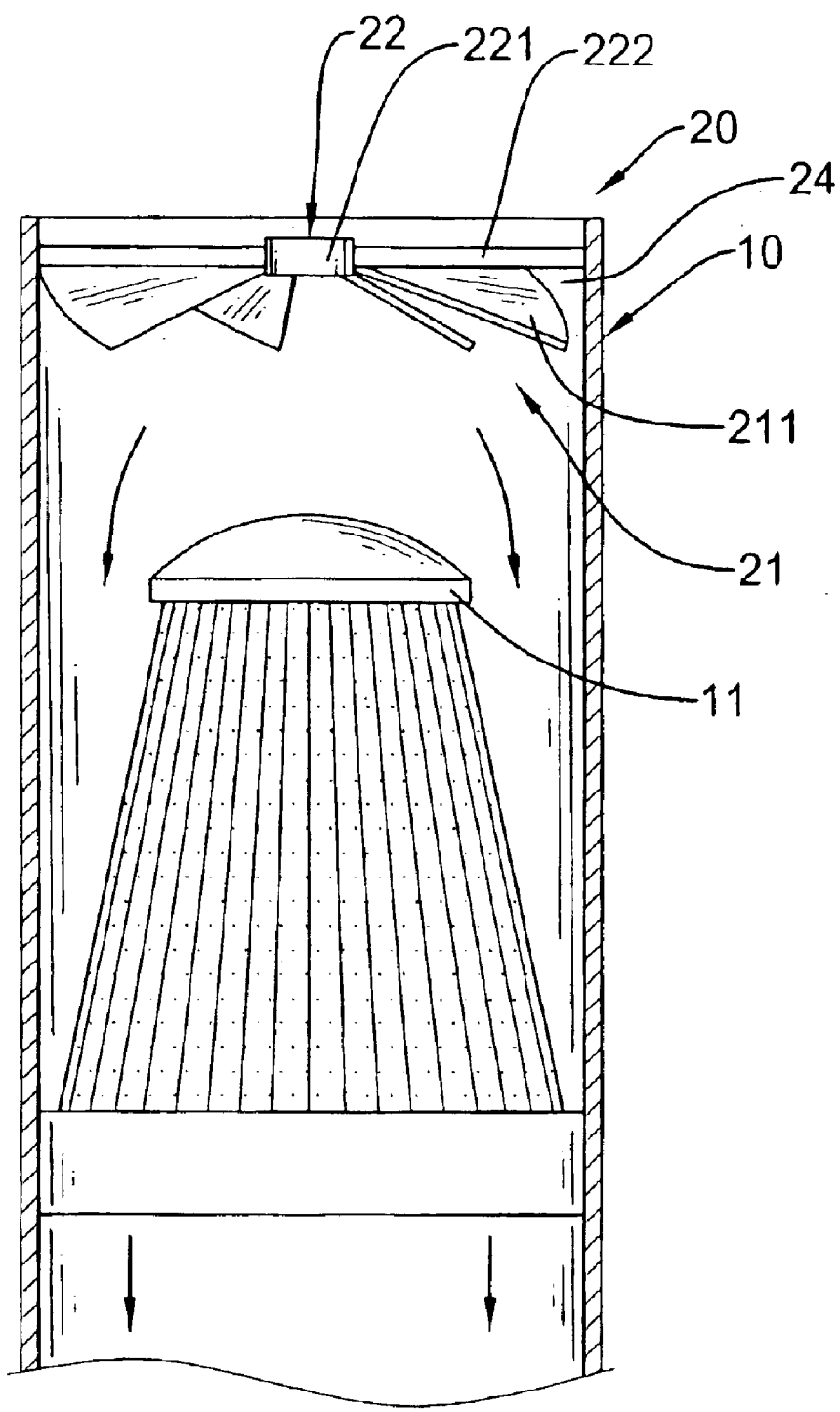
FIG. 2 is a schematic side view showing movement of the blades due to the generation of the suction force generated by the operation of the engine.

With reference to FIGS. 1 and 2, the intake device (20) in accordance with the present invention is mounted in the intake manifold (10) with an air filter (11) mounted therein. The intake device (20) of the present invention has a blade assembly (21) and a positioning seat (22).

The positioning seat (22) has a seat (221) having a diameter smaller than that of the intake manifold (10) and ribs (222) divergently extending out from the seat (221) to engage with an inner periphery of the intake manifold (10).

The blade assembly (21) has multiple blades (211) made of resilient material and each arranged between two adjacent ribs (222) to fill every space between every two adjacent ribs (222). Each blade (211) has a first side (212) and a second side opposite to the first side (212). The first side (212) is securely connected to one of the ribs (222) so that the second side is movable relative to the first side (212). Therefore, it is noted that before the internal combustion engine operates, the intake manifold (10) basically is closed.

After assembly of the intake device (20) of the present invention with the intake manifold (10), it is noted that the intake device (20) is mounted above the air filter (11). It is known in the art that when the engine operates, a suction force is generated due to the operation of the engine. After the generation of the suction force, the second sides of each of the blades (211) are thus sucked downward into the intake manifold (10). As the suction force becomes bigger due to the operation speed of the internal combustion engine becoming faster and faster, a gap (24) defined between the second sides of each of the blades (211) and the adjacent rib (222) becomes greater and greater. Therefore, it is noted that the intake device (20) of the present invention is able to adjust the quantity of air intake into the intake manifold (10) according to the suction force.

Furthermore, when the second sides of the blades (211) are drawn downward into the intake manifold (10), the air sucked into the intake manifold (10) flows helically, which increases the efficiency of the internal combustion engine.

Figure 3:
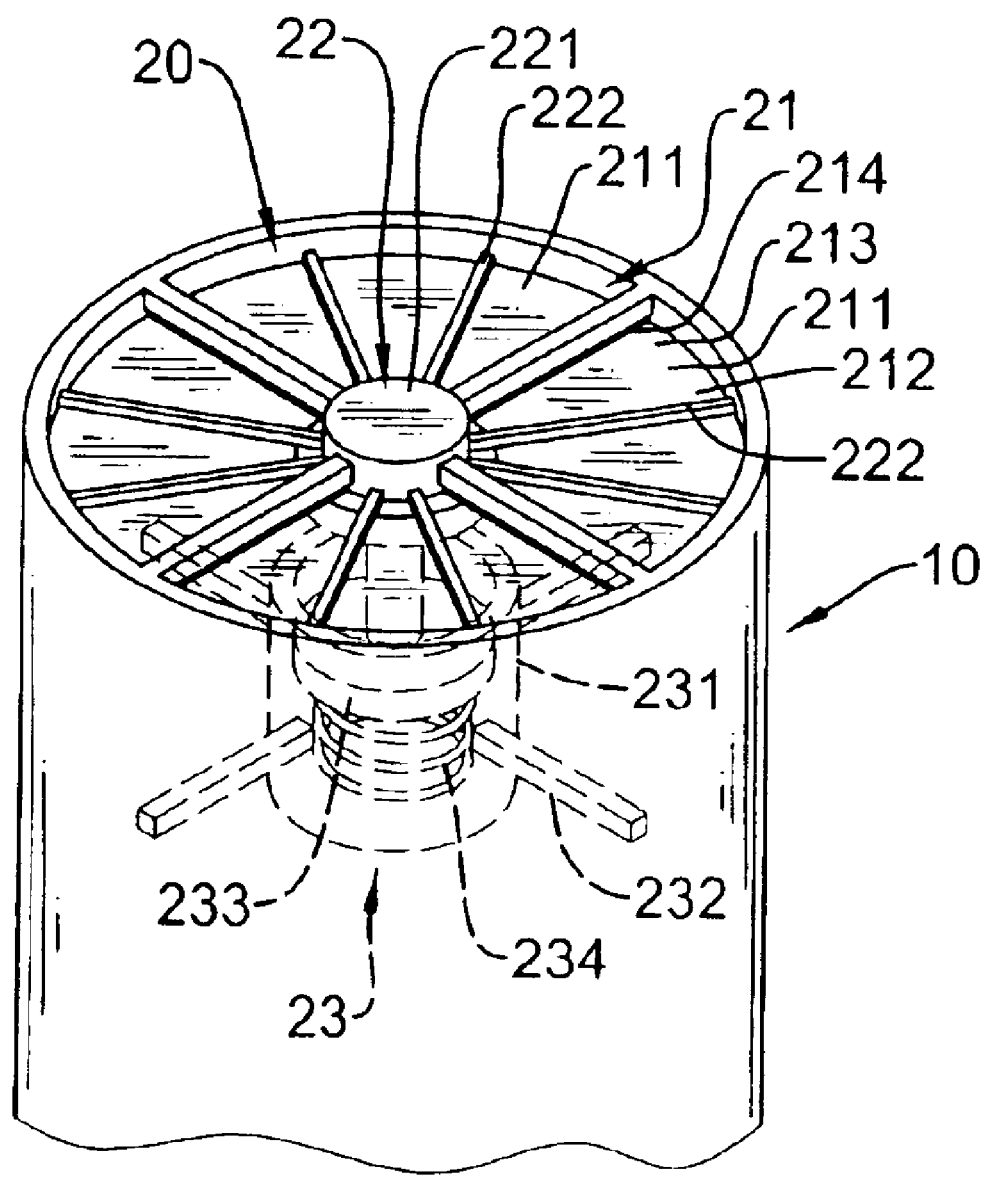
FIG. 3 is a perspective view of the second embodiment of the intake device of the present invention.
Figure 4:
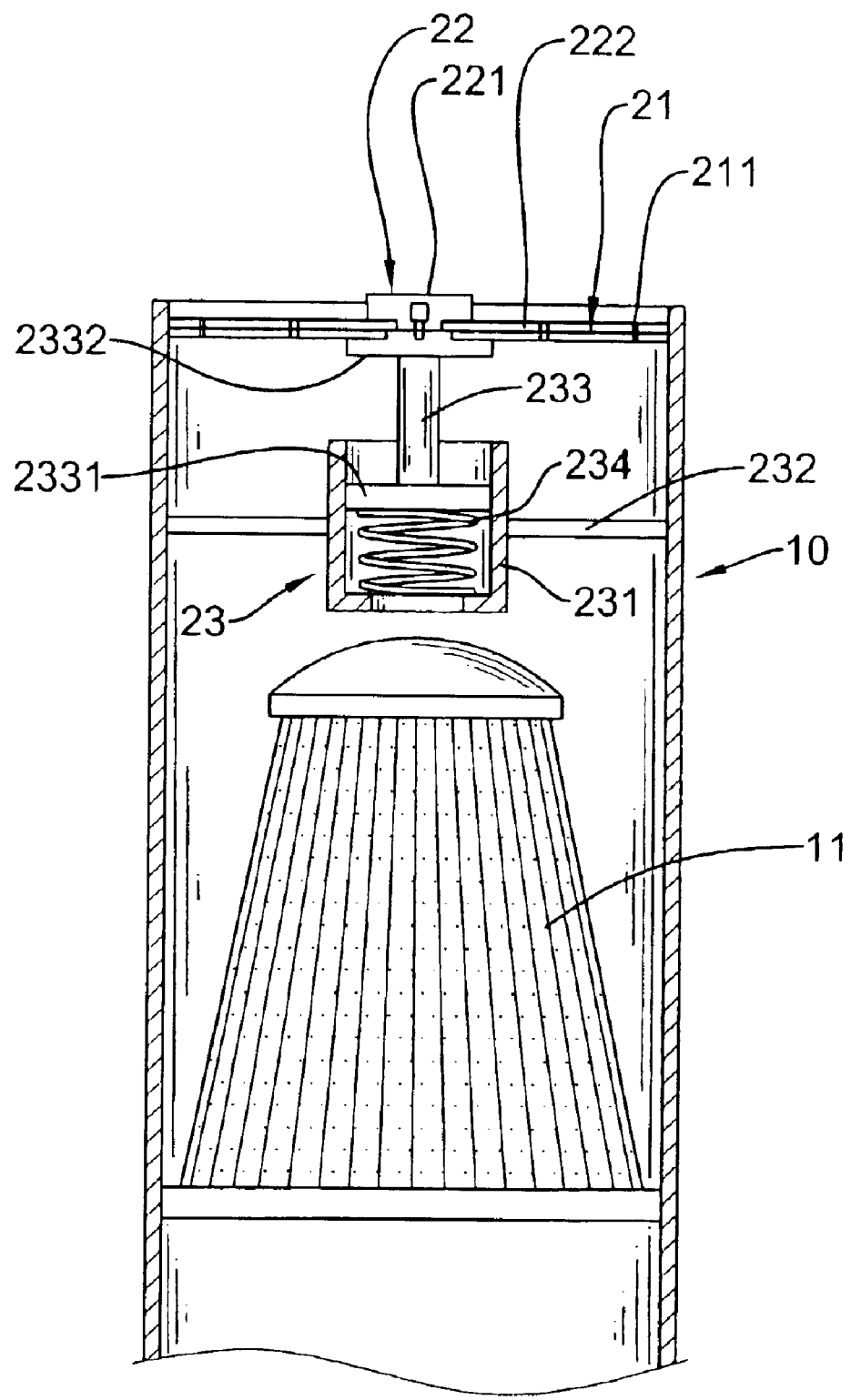
FIG. 4 is a schematic side view showing the installation of the second embodiment of the intake device in the intake manifold.
Figure 5:
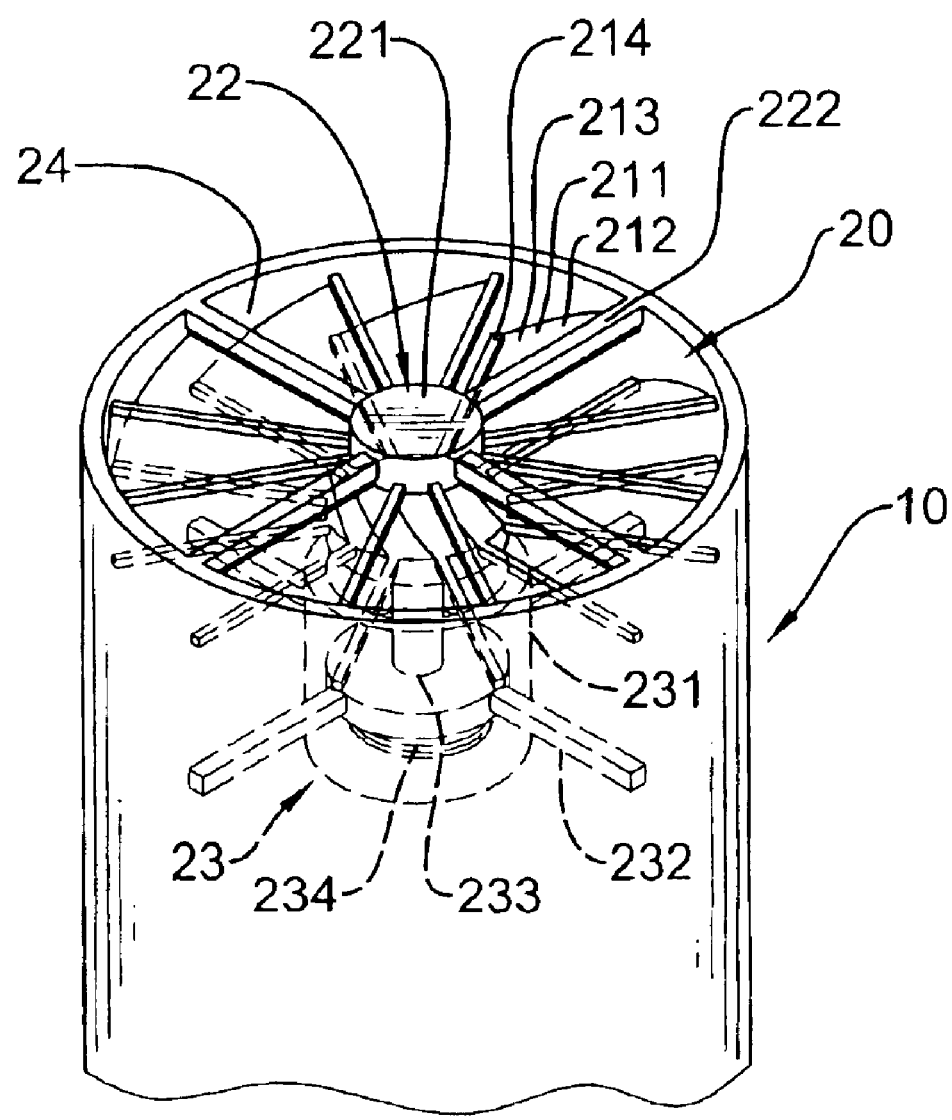
FIG. 5 is a schematic view showing the operation of the second embodiment of the intake device of the present invention.

With reference to FIGS. 3 and 4, a second preferred embodiment of the present invention is shown. Beside what is described already in FIGS. 1 and 2, the intake device (20) of the present invention further has a moving assembly (23).

The moving assembly (23) has a hollow cylindrical tube (231) received in the intake manifold (10), multiple legs (232) sandwiched between the inner periphery of the intake manifold (10) and an outer periphery of the tube (231) to position the tube (231) in the intake manifold (10), a moving link (233) movably received in the tube (231) and having a bottom disk (2331) abutted to a distal end of a spring (234) compressibly received in the tube (231) and a top disk (2332) extending out of the tube (231). Further, the second sides (213) of each of the blades (211) are respectively provided with a bar (214) which is securely connected to a top face of the top disk (2332).

Therefore, when the internal combustion engine is in operation, the suction force generated by the internal combustion engine sucks downward the blades (211) and the moving link (233). Because the first sides (212) of the blades (211) are securely connected to the adjacent rib (222) and the second sides (213) are movable relative to the first sides (212) and respectively securely connected to a bar (214), the downward movement of the blades (211) drives the second sides (213) and the moving link (233) to move downward as well, which compresses the spring (234). As the magnitude of the suction force becomes larger and larger, the gap (24) defined between the second side (213) and the adjacent rib (222) is bigger and bigger. Therefore, the air flow into the intake manifold (10) is adjusted according to the suction force from the internal combustion engine.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An intake device for an intake manifold of an internal combustion engine, the intake device comprising:

a seat;

multiple ribs extending out from the seat and adapted to connect to an inner periphery of the intake manifold;

multiple blades each arranged between two adjacent ribs, each blade having a first side securely connected to the adjacent rib and a second side opposite to the first side and being movable relative to the first side, wherein a gap defined between the second side of the blade and the adjacent rib is adjustable according to magnitude of a suction force;

a hollow cylindrical tube adapted to be received in the intake manifold and provided with multiple legs adapted to be sandwiched between the inner periphery of the intake manifold and an outer periphery of the tube such that the tube is positioned in the intake manifold;

bars each securely connected to the second sides of the blades;

a moving link movably received in the tube and having a top disk securely connected to the bars and a bottom disk securely connected to the top disk;

whereby the downward movement of the blades drives the moving link to move accordingly, which also drives the bars attached to the second sides of the blades to move; and whereby when the internal combustion engine operates, suction force generated inside the intake manifold is able to draw downward the second sides of the blades such that air drawn into the intake manifold flows helically.

2. The intake device as claimed in claim 1 further comprising a spring compressibly received in the tube and securely connected to the bottom disk such that when the moving link is moving downward, the bottom disk compresses the spring and when force driving the moving link to move downward is withdrawn, the spring provides a recovery force to the moving link to restore the blades.

* * * * *